Jan. 3, 1939.   G. F. ZELLHOEFER   2,142,960
REFRIGERATING APPARATUS
Filed March 29, 1937
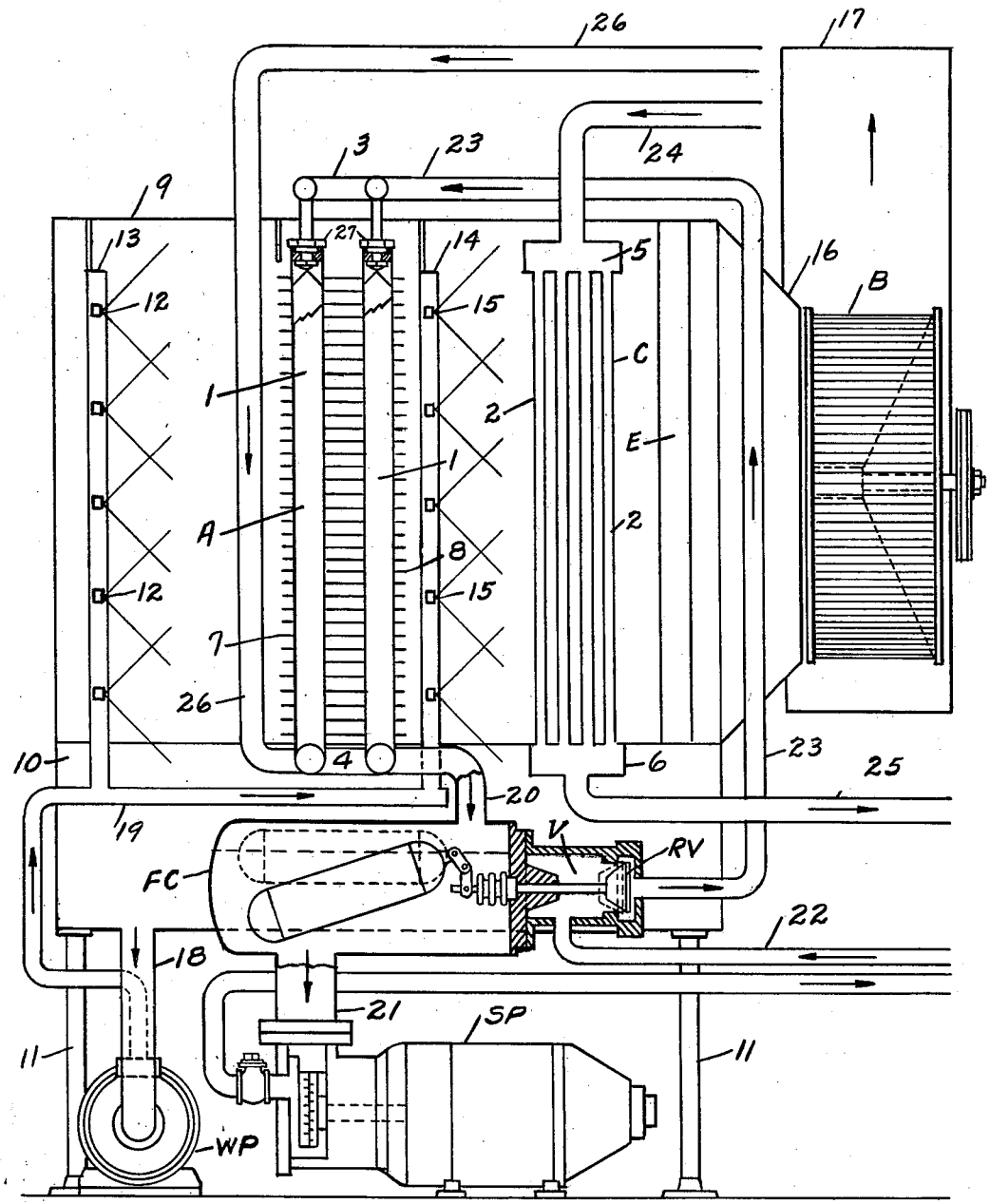
INVENTOR.
GLENN F. ZELLHOEFER
BY Langdon Moore
ATTORNEY.

Patented Jan. 3, 1939

2,142,960

UNITED STATES PATENT OFFICE 2,142,960

REFRIGERATING APPARATUS

Glenn F. Zellhoefer, Bloomington, Ill., assignor to Williams Oil-O-Matic Heating Corporation, Bloomington, Ill., a corporation of Illinois Application March 29, 1937, Serial No. 133,520

5 Claims. (Cl. 62—119)

This invention relates to improvements in the absorption type of refrigerating apparatus in which a solvent such as dimethyl ether of tetraethylene glycol, or a similar type of chemical, forms a solution with a refrigerant such as dichloromonofluoromethane, or a similar type of chemical in the absorber, the solution passed into a heater or still wherein the refrigerant is released or boiled off the solution and delivered to a condenser, collected as a liquid in a receiver, and delivered to an evaporator in which it vaporizes and from which the gaseous refrigerant is returned to the absorber while the solvent of the solution from which the refrigerant has been separated in the heater returns to the absorber. This invention relates more particularly to an improved method and means by which the condenser and absorber are cooled by evaporative cooling.

With these and other objects in view, reference is made to the accompanying drawing which illustrates a preferred embodiment of this invention, with the understanding that detail changes may be made without departing from the scope thereof.

The single figure of the drawing is a diagrammatical representation in elevation of an absorber and condenser with the connections to the receiver and to the heat exchanger and heater such as employed in an absorption type of refrigerating apparatus as described above.

Inasmuch as the invention relates to the cooling of the absorber and condenser only, the other elements of the system of refrigeration above described are omitted, as their particular construction is not essential to the understanding of this invention. The absorber A and condenser C are each formed of a plurality of vertical pipes 1 and 2, respectively, arranged in spaced-apart parallel relation and with the absorber spaced apart from the condenser. The upper and lower ends of the pipes 1 and 2 are each connected to separate manifolds or headers 3 and 4 in the absorber and 5 and 6 in the condenser. Each series of pipes 1 and 2 is preferably provided with a plurality of horizontal equally-spaced-apart radiating plates or fins 7 and 8, respectively.

The absorber A and condenser C are supported within a casing 9 above a water tank 10 resting upon legs 11. A bank of spray nozzles 12, directed toward the absorber A, are connected to a row of vertical pipes 13 within and adjacent an open end of the casing 9 and a similar row of pipes 14, having spray nozzles 15 directed toward the condenser C, is arranged between the absorber A and condenser C. The open end of the casing 9 adjacent the condenser C is provided with a casing 16 connected to the intake side of a circulating blower B contained in an air-duct 17, whereby air is drawn in through the opposite open end of the casing 9 over the absorber A, condenser C, and eliminator E. A water pump WP circulates water from the tank 10 by the way of pipe 18 and through pipe 19 to the spray nozzle pipes 13 and 14 to spray water upon the pipes 1 and 2 of the absorber A and condenser C while the circulating blower B is drawing air over them.

The solution formed in the absorber A is conducted from the manifold 4 through pipe 20 to the float chamber FC and from the float chamber by pipe 21 to the intake of a solution pump SP which circulates the solution through the customary heat-exchanger to the heater or still, not shown, where the refrigerant is liberated in gaseous form. The solvent remaining in the heater is returned by pipe 22 through the valve chamber V, and by the float-regulated valve RV, controlled by the level of the solution in the float chamber FC, and through pipe 23 to the upper manifold 3 of the absorber A. While this is occurring, the gaseous refrigerant from the heater or still, not shown, is conducted by pipe 24 to the upper manifold 5 of the condenser C. The condensed gaseous refrigerant passes through the lower manifold 6 into the pipe 25 to the receiver and evaporator, not shown, and is returned as a vapor from the evaporator by pipe 26 to the lower manifold 4 of the absorber A.

The solvent is discharged from the manifold 3 through spray nozzles 27 into each pipe 1, so that it is distributed and descends over the interior wall of each of the absorber pipes 1 in the form of a film, while the gaseous refrigerant from the pipe 26 ascends within each of the absorber tubes 1 from the manifold 4, whereby the solution is formed in the pipes 1 and is collected in the lower manifold 4 to be circulated through the system by the solution pump SP, as hereinbefore described.

This method of introducing the weak solution into the absorber insures proper distribution of a film of solution over the interior wall of the absorber tube, and the size of the pipe, together with the large manifold, insures adequate distribution of gaseous refrigerant throughout the unit.

The absorber should be designed to afford adequate heat-liberating surface from the exterior walls and at the same time the proper amount of interior surface so as to insure a thin film of solution over the interior wall. If too great an amount of surface is provided on the interior walls for the amount of solution handled, all of this surface is not covered by a film of solution, and this surface is then not used to the best advantage. On the other hand, if too great an amount of solution is sprayed into the absorber for the circumference of the pipes thereof, the film of solution on the interior wall is too great for proper absorption of the gaseous refrigerant.

The design must afford ample volume within the absorber to insure proper distribution of the gaseous refrigerant, and its absorption in the solution.

What I claim is:

1. In an absorption refrigerating apparatus, wherein the absorber is formed of a plurality of exposed vertical unobstructed tubes provided with means for spraying the returned weak liquor to travel downward in a film upon the interior walls of said absorber tubes while the returned refrigerant advances upwardly in said tubes, means for spraying cooling water upon the exterior of said absorber tubes, and means for directing a current of air over the exterior of said absorber tubes to evaporate the water upon the exterior of the absorber tubes.

2. In an absorption refrigerating apparatus, a casing open at opposite ends, an absorber including a plurality of vertical exposed spaced-apart unobstructed tubes joined at the upper and lower ends to respective headers arranged within the casing, means for delivering the weak liquor to the tubes in the form of a film that descends upon the interior of the absorber tubes, means to deliver the returned refrigerant to ascend within the absorber tubes, and means to induce a draft of cooling air to pass through said casing and over said absorber tubes to carry away the heat transmitted to the exterior of said tubes.

3. In an absorption refrigerating apparatus, a casing open at opposite ends, an absorber including a plurality of vertical exposed spaced-apart unobstructed tubes joined at the upper and lower ends to respective headers arranged within the casing, means for delivering the weak liquor to the tubes in the form of a film that descends upon the interior of the absorber tubes, means to deliver the returned refrigerant to ascend within the absorber tubes, a water tank supporting said casing and forming the bottom thereof, means for spraying said water over the the exterior of said absorber tubes, and means to induce a draft of cooling air to pass through said casing and over said absorber tubes to evaporate the water upon the exterior of the absorber tubes.

4. The structure of claim 2 in combination with a condenser for the gaseous refrigerant arranged within said casing spaced apart from the absorber and on the air exit side thereof.

5. The structure of claim 3 in combination with a condenser for the gaseous refrigerant including a plurality of vertical exposed spaced apart tubes separated and spaced apart from said absorber on the air exit side thereof, and means for spraying water over the exterior of the condenser tubes from said water tank.

GLENN F. ZELLHOEFER.